United States Patent [19]
Menges et al.

[11] 3,946,998
[45] Mar. 30, 1976

[54] SINGLE WORM EXTRUDER

[75] Inventors: Hans George Ludwig Menges, Lavrensberg-by-Aachen; Engelbert Gerhard Harms, Vaalserquartier by Aachen; Josef Peter Lehnen, Verlautenheide-by-Aachen, all of Germany

[73] Assignee: Uniroyal Aktiengesellschaft, Aachen-Rothe-Erde, Germany

[22] Filed: June 18, 1971

[21] Appl. No.: 154,490

[30] Foreign Application Priority Data
June 30, 1970 Germany............................ 2032197

[52] U.S. Cl. .............................................. 259/191
[51] Int. Cl.² ......................................... B29B 1/06
[58] Field of Search ......... 259/191, 192, 193, 9, 10, 259/25, 26, 45, 46, 97, 109, 110; 425/207, 208, 209; 100/145, 146; 198/213, 214, 216, 217

[56] References Cited
UNITED STATES PATENTS

| 2,838,794 | 6/1958 | Munger | 259/191 |
| 3,189,324 | 6/1965 | Gubler | 259/9 |
| 3,271,819 | 9/1966 | Lacher | 259/191 |
| 3,300,810 | 1/1967 | Gregory | 259/191 |
| 3,570,654 | 3/1971 | Hill | 259/9 |

*Primary Examiner*—Robert W. Jenkins
*Attorney, Agent, or Firm*—Jay L. Chaskin

[57] ABSTRACT

Single-screw extruder for mixing viscous materials by dividing material in only the forward flow direction in an irregular sequence into a plurality of communicating flow paths which are subjected to constant change between being divided and rejoined. Extruder design can be varied by removable and interchangeable partial arcuate screw sections which are affixed to the body of the screw in the space between selected threads of a continuous screw thread.

14 Claims, 6 Drawing Figures

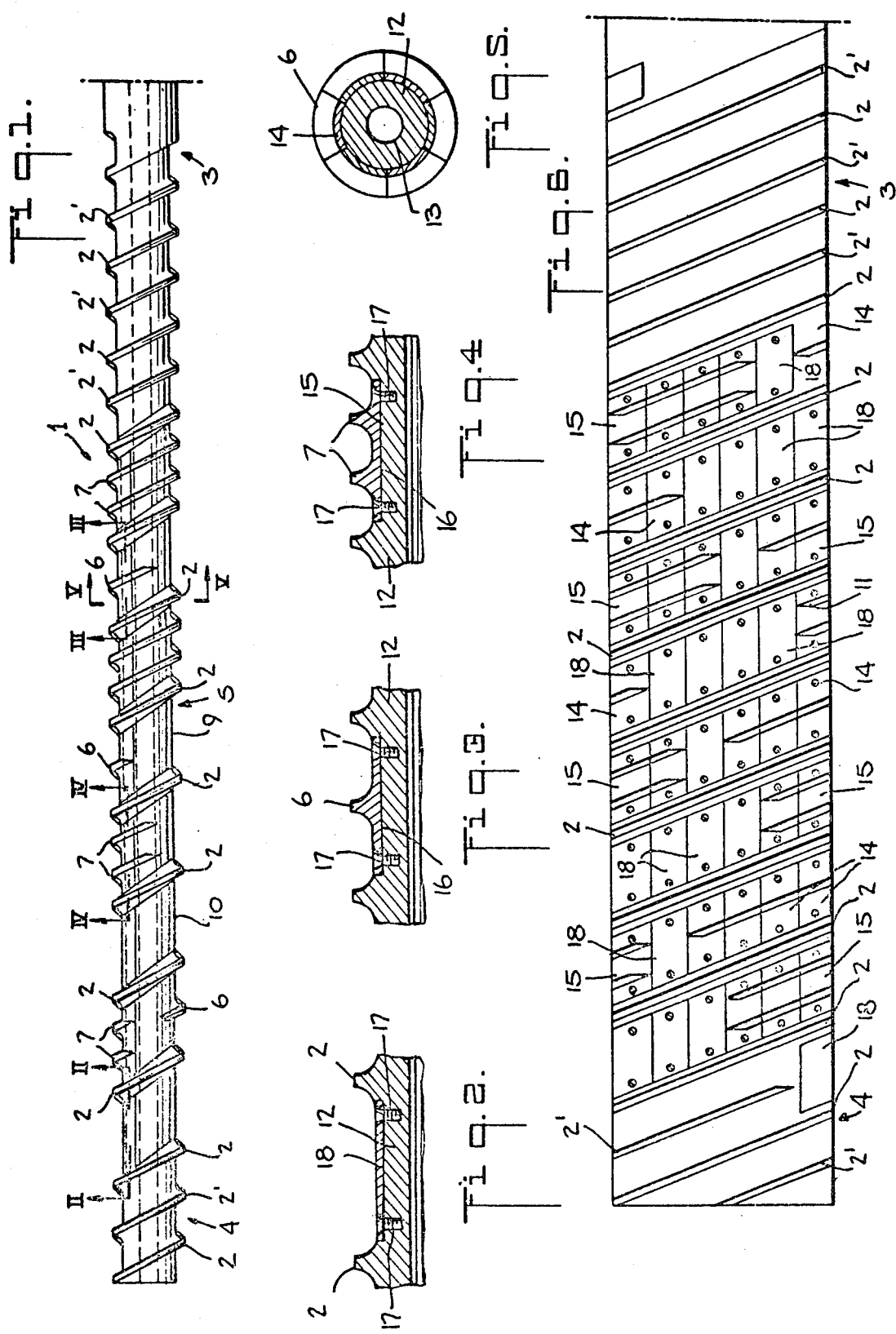

SINGLE WORM EXTRUDER

The invention relates to apparatus for processing highly viscous materials, particularly the processing of rubber mixtures with varied proportions of natural rubber and fillers in a single worm extruder.

As used herein the terms "plastic" and "plastic materials" are intended to mean materials which are yieldable or moldable in nature.

In order to achieve an extruded plastic of good quality it is necessary to extensively mix the plastic material to produce a homogeneous product while maintaining temperature constant over time at any particular point along the extruder. In a single worm extruder the mixing and the homogenizing of the plastic material is carried out by a single rotating screw mounted in a cylindrical barrel. The material is homogenized, masticated, and intermixed by the interaction of the rotating worm or screw and the cylinder walls. After the material is mechanically and thermally mixed into a homogenous substance, it is then ejected through a die to form its permanent shape. The passage through the die should be at as uniform a speed as possible.

Screw extruders are known for the processing of rubber, plastic and the like in which the screw is divided into segments of different configuration such that the homogenity and the uniform plasticity is improved by the separation of molten and solid materials. This is done by causing the extrudant to flow between the land of the screw and the inside wall of the screw cylinder. The melt is separated from the solid phase of the plastic to be processed during the conveying of the latter in the screw by collecting it in a receptable which the components of the plastic still in the solid phase cannot reach.

A single worm extruder for the mixing and processing of rubber consists of two sections, an intake section and a mixing section. The mixing section has lands countercurrent to those of the intake section for partially back-feeding the rubber on to the intake section to provide a turbulent current of material. The countercurrent lands are interrupted by gaps which collectively have the same total area as the cross-sectional area of the intake section. The material is divided into a number of back-feed flows which thereafter recombine. Such extruders are disclosed in Menges et al., U.S. Pat. application Ser. No. 55,542, filed July 16, 1970, now U.S. Pat. No. 3,680,844, and Lehnen et al., U.S. Pat. application Ser. No. 808,543, filed Mar. 19, 1969, and now abandoned, both of which applications are assigned to same assignee as the present application.

In this process, the heat resulting from the mastication of the material in the worm is utilized to liquify the extrudant. However, when processing rubber mixtures, it is undesirable to heat the rubber beyond 120°C. since the rubber mixture will be damaged. On the other hand, due to the high apparent viscosity of rubber mixtures, rubber heats up relatively quickly while being mixed and homogenized, especially when high output is needed. Furthermore where the material is back-fed, the rate of extruded output is adversely affected. This is particularly true with mixtures containing high percentages of natural rubber. Additionally the poor heat conductivity of rubber mixtures results in irregular heating during the mixing and homogenizing process. The resulting non-homogenous high temperature affects the quality of the extrusion because the thorough mixing occurs primarily in the peripheral area at the lands of the screw.

It is the object of the invention to make it possible to carry out the processing of highly viscous materials, particularly rubber mixtures, by means of a single worm extruder, without adversely affecting the rate of extruded output.

According to the method of the present invention, the flow of the material through the extruder, is subjected to numerous phases of being separated and combined without back-feeding. The separation of the material into several flow paths and the combining of all or a number of them, is preferably arranged at an irregular sequence, without any change or reversal in the general direction of material flow through the extruder.

This type of processing provides an improved mixing effect without interfering with the general direction of flow of the material. When the material flow is divided into a plurality of flow paths, the velocity of the material in the direction of flow is increased. The division or separation of the material flow into a plurality of flow paths provides an increase in the number of peripheral areas at the lands of the screw assuring a thorough mixing of the material. There is also a reduction in the temperature gradient within the material and therefore an improved homogeniety in the mixture. When the divided flow paths are combined to form a single flow path of material, the velocity of the material flow is reduced because the material now has a large cross section. The flow of material may thereafter again be divided and separated and recombined. The variation of the flow of the material from a single flow path to a plurality of divided flow paths and vice versa and the variation in the number of divided flow paths, provides an improved mixing while the material flows smoothly through the extruder. At the same time, the extruder-screw is self-cleaning since there is no reversal in the direction of material flow.

The single screw extruder, according to the invention is a multi-threaded screw with a continuous main screw thread having a constant pitch. Intermediate adjacent threads of the main screw is an appreciable portion of the body of the screw which does not have any threads. In this thread-free portion, the material mixture recombines into a single flow path resulting in a reduction of the material flow through the extruder and an accompanying increase in the apparent density of the material.

Located in selected thread-free portions is at least one partial screw thread having a predetermined pitch and thread length. The partial screw threads need not be located in every thread-free portion of the main screw thread. The partial screw threads divide and separate the material in a plurality of flow paths. Selectively, the partial screw threads may be less than a full turn about the body of the screw. Furthermore the partial screw threads can have a pitch different than that of the main screw. The partial screw threads can be arranged on arcuate sections which are located in the thread-free portions between the threads of the continuous main screw on the body of the screw. Preferably, the arcuate sections of partial screw threads are removably secured in recesses provided in the screw body. The arcuate sections can be selectively arranged in a predetermined pattern about the circumference of the entire length of the screw body. In this manner it is possible to vary the mixing pattern by removing and rearranging the location of one or more of the partial screw threads according to the type of material. When an optimum mixing pattern for a particular material is established, the final arrangement of the partial screw threads provides a design for future extruders.

The invention will be better understood when read with the detailed description and the following drawings, in which:

FIG. 1 is a side view of an extruder-screw according to the invention;

FIGS. 2, 3 and 4 are cross-sectional views of the extruder-screw, along the lines II—II, III—III and IV—IV of FIG. 1, showing the profile view of the partial screw thread arcuate sections;

FIG. 5 is a cross-sectional view along line V—V of the extruder-screw of FIG. 1; and FIG. 6 is a plan view of the circumference of the extruder-screw of FIG. 1 showing the dividing and separation of the material and the arrangement of the partial screw thread arcuate sections.

As seen in FIG. 1, screw 1 of an extruder is provided with a multi-threaded screw 2, which is continuous from an inlet zone 3 to an outlet zone 4. The inlet zone 3 and the outlet zone 4, may also contain a further multi-thread screw 2'.

Located between the zones 3 and 4 is a certain mixing zone 5. In selected thread-free portions between the threads of the continuous screw 2 is disposed partial screw arcuate sections 6 and 7. These sections 6 and 7 repeatedly divide the material flow into two or three partial streams. The partial screw arcuate sections 6 and 7 are limited in length, although more than two such sections of limited length may be added. The location along the screw 1 of the sections 6 and 7 can be varied so as to change the design of the extruder in accordance with the material to be mixed. Furthermore the spacing between the end of one partial screw section and the beginning of another partial screw section may be varied, as well as the overall length of each partial screw section along the screw 1. Each partial screw section may comprise less to more than one continuous thread. Thread-free portions 8, 9 and 10, which in the screw shown in the drawing, do not contain any partial screw sections, provide a joining of the separated and divided material flow and also provide a mixing of the mass of the partial flow paths with each other. Depending on the length along the screw of the thread-free portions, as viewed in the direction of the material flow, the separated flow paths can merge with each other and become denser, and thereafter are again divided into several partial flow paths. This constant change of dividing, separating and rejoining the material flow over the whole length of the screw leads promotes an intensive mixing of the material without adversely affecting the rate of material flow output. The partial screw sections can be of the same height, i.e., outer diameter, as the continuous screw web 2. The partial screw sections may have the same width as the continuous screw 2, but they can also be wider or narrower. It is preferable to terminate each end of the thread of each partial screw section in a tip 11, which may comprise a one-sided or two-sided beveled or chamfered slope where it intersects the body 12 of the screw 1. In accordance with the preferred embodiment of this invention the direction of the threads of the screw 2 and each partial screw section is the same.

The screw 1 has a body 12 and a central bore 13 for heating or cooling. The partial screw sections 6 or 7 are disposed on arcuate sections 14, 15, which are disposed in corresponding recesses 16 of the screw body 12. Removable fastening means, such as screws 17, attach the arcuate sections to the body 12. In the thread-free portions 8, 9, 10, there is provided blank arcuate sections 18 in recesses 16 which follow the thread of the continuous screw 2. The blank arcuate sections 18 and the partial screw sections 6 and 7 can be varied in location both circumferentially as well as along the length of the screw 1 depending on the characteristics of the material mixture to be processed. The partial screw sections 14, 15 and the blank section 18 are arcuate sections having the same radius as the screw body 12 and may comprise any desired arcuate angle. For example, an arcuate section of 60° would mean that six such sections are required to form the circumference of the screw. Each of the arcuate sections 14, 15, whether of one, two or more than two partial screw sections and the blank arcuate section 18 are of the same size and have the same base area and are therefore interchangeable.

While there has been described what is at present considered to be the preferred embodiment of this invention, various changes and modifications may be made therein without departing from the spirit of the invention and it is intended to cover all such changes which may come within the scope of the invention.

Having thus described our invention, what we claim and desire to protect by Letters Patent is:

1. A single worm extruder screw for rubber mixtures and the like having a continuous main screw thread along a screw body and at least one partial screw thread section located on the screw body between the threads of the continuous main screw, the partial screw thread being removable from the screw body, and the threads of the partial and main screw being oriented in the same direction.

2. The extruder screw according to claim 1 wherein a plurality of partial screw thread sections are disposed along the length of the screw body in an irregular sequence.

3. The extruder screw according to claim 1 wherein a plurality of partial screw thread sections are disposed circumferentially about the screw body in an irregular sequence.

4. The extruder screw according to claim 1 wherein the partial screw thread sections are arcuate sections removably fastened to the screw body.

5. The extruder screw according to claim 4 wherein the arcuate sections are of an angle of 60°.

6. The extruder screw according to claim 1 wherein the partial screw thread sections are removably disposed in recesses on the screw body.

7. The extruder screw according to claim 1 wherein the thread of the partial screw thread being less than a full turn about the screw body.

8. The extruder screw according to claim 1 wherein the thread of the partial screw thread is at least one full turn about the screw body.

9. The extruder screw according to claim 1 wherein each end of the thread of the partial screw thread terminates in a beveled tip.

10. The extruder screw according to claim 1 wherein the outer diameter of the threads of the partial and continuous main screw threads are the same.

11. The extruder screw according to claim 1 wherein the width of the threads of the partial and continuous main screw threads are the same.

12. The extruder screw according to claim 1 further including removable blank sections between the threads of the continuous main screw.

13. The extruder screw according to claim 12 wherein the blank sections are arcuate sections disposed in recesses in the screw body.

14. The extruder screw according to claim 12 wherein the base area of the blank and partial screw thread sections is the same.

* * * * *